(12) United States Patent
Tsunokawa et al.

(10) Patent No.: US 8,332,891 B2
(45) Date of Patent: Dec. 11, 2012

(54) INFORMATION PROCESSING APPARATUS AND METHOD, AND PROGRAM

(75) Inventors: Motoki Tsunokawa, Chiba (JP); Yasufumi Shinagawa, Saitama (JP); Tatsuya Narahara, Kanagawa (JP); Nobuyuki Fujiwara, Kanagawa (JP); Kazuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 882 days.

(21) Appl. No.: 10/518,502

(22) PCT Filed: May 15, 2003

(86) PCT No.: PCT/JP03/06042
§ 371 (c)(1),
(2), (4) Date: Jun. 22, 2005

(87) PCT Pub. No.: WO2004/004323
PCT Pub. Date: Jan. 8, 2004

(65) Prior Publication Data
US 2005/0240957 A1 Oct. 27, 2005

(30) Foreign Application Priority Data
Jun. 26, 2002 (JP) ................................. 2002-185584

(51) Int. Cl.
*G06F 3/00* (2006.01)
*G06F 13/00* (2006.01)
*H04N 5/445* (2011.01)
(52) U.S. Cl. ............................... 725/45; 725/40; 725/52
(58) Field of Classification Search ............... 725/44–47, 725/53, 57, 61; 707/6
See application file for complete search history.

(56) References Cited

U.S. PATENT DOCUMENTS

| | | | | |
|---|---|---|---|---|
| 5,600,364 | A | * | 2/1997 | Hendricks et al. ................. 725/9 |
| 5,835,087 | A | * | 11/1998 | Herz et al. ....................... 725/46 |
| 6,002,394 | A | | 12/1999 | Schein et al. |
| 6,005,565 | A | | 12/1999 | Legall et al. |
| 6,581,207 | B1 | * | 6/2003 | Sumita et al. .................... 725/46 |
| 6,634,947 | B1 | * | 10/2003 | Miyamoto et al. .............. 463/36 |
| 7,213,205 | B1 | * | 5/2007 | Miwa et al ..................... 715/234 |
| 2001/0027557 | A1 | | 10/2001 | Shinkawa et al. |
| 2004/0078829 | A1 | * | 4/2004 | Patel et al. ..................... 725/135 |
| 2005/0076378 | A1 | * | 4/2005 | Omoigui ......................... 725/56 |
| 2006/0095937 | A1 | * | 5/2006 | Knudson et al. ................. 725/45 |

FOREIGN PATENT DOCUMENTS

| | | |
|---|---|---|
| JP | 10-069496 | 3/1998 |
| JP | 10-69496 | 3/1998 |
| JP | 10-512420 | 11/1998 |
| JP | 11-025541 | 1/1999 |
| JP | 11-341381 | 12/1999 |
| JP | 2000-307993 | 11/2000 |

(Continued)

*Primary Examiner* — Bennett Ingvoldstad
(74) *Attorney, Agent, or Firm* — Oblon, Spivak, McClelland, Maier & Neustadt, L.L.P.

(57) ABSTRACT

An interface receives a file containing information about a plurality of characteristic words representing characteristics of television programs. A display section of an information processing apparatus displays one of the plurality of characteristic words in a different color than an other of the plurality of characteristic words. A communication section allows a selection of the one of the plurality of characteristic words. The interface transmits information about the one of the plurality of characteristic words to a recording and playback apparatus upon the selection. Further, the interface receives television program information about one of the television programs from the recording and playback apparatus in response to the information about the one of the plurality of characteristic words.

17 Claims, 13 Drawing Sheets

FOREIGN PATENT DOCUMENTS

| | | |
|---|---|---|
| JP | 2001-238196 | 8/2001 |
| JP | 2001-326865 | 11/2001 |
| JP | 2002-108887 | 4/2002 |
| WO | 01/78382 | 10/2001 |

* cited by examiner

F I G. 1
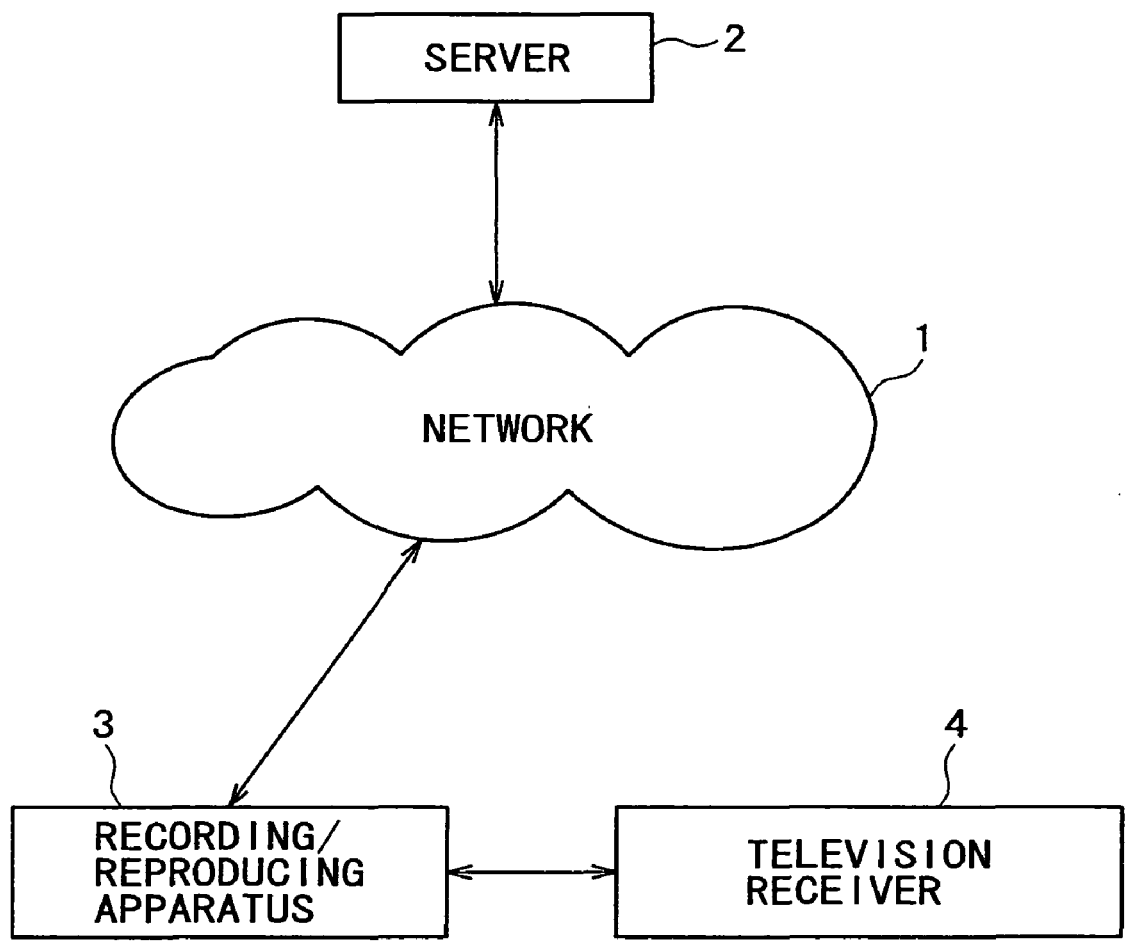

FIG. 7

| ID | BROADCAST STATION | BROADCAST DATE AND TIME | TELEVISION PROGRAM NAME | CONTENT | GENRE | FUNCTION |
|---|---|---|---|---|---|---|
| 0001 | 1 | 0:00~1:00 | A | ... | ... | ... |
| 0002 | 1 | 1:00~2:00 | B | ... | ... | ... |
| ... | ... | ... | ... | ... | ... | ... |

101

F I G. 8

| ID | CHARACTERISTIC WORD |
|---|---|
| 0001 | WORLD CUP |
| 0051 | FISHING, BLACK BASS |
| 0052 | FISHING, SWEETFISH, TAMA RIVER |
| 0100 | KYOJIN, HANSHIN |
| 〜 | 〜 |

102

F I G. 9

| CHARACTERISTIC WORD |
|---|
| WORLD CUP, FISHING, BLACKBASS, SWEETFISH, TAMA RIVER, KYOJIN, HANSHIN, ··· <br> ...... |

103

INFORMATION PROCESSING APPARATUS AND METHOD, AND PROGRAM

TECHNICAL FIELD

The present invention relates to an information processing apparatus and a method thereof as well as a software program. Specifically, the present invention relates to an information processing apparatus and a method thereof as well as a software program suitably used for an apparatus which allows a user to easily retrieve intended television programs for watching and listening from much information.

BACKGROUND ART

In recent years, the television broadcast has spread in the form of not only surface-wave broadcast, but also satellite broadcast using artificial satellites. Consequently, the number of channels is increasing. Increasing the number of channels inevitably increases the number of television programs. There is a trend of providing television programs that more properly suite the audience interests.

It is beneficial for the audience to be able to watch and listen to television programs that suit their interests. However, it has been difficult and troublesome to search for the intended television programs out of a large number of television programs and out of information about them.

Information about television programs is provided in the forms of television program guides distributed on paper media such as newspapers and EPG (Electronic Program Guide) distributed via networks. These guides are available in table formats comprising broadcast stations associated with broadcast times. Though the tabular television program guides are well designed for high visibility, the amount of information is large. The audience feels it difficult to search for intended television programs and needs a long time for the search.

There is proposed the method of using keywords to be able to easily search for television programs intended by the audience. According to this method, for example, the audience selects one or more of a plurality of predetermined keywords that match the audience's interest. Television program information including the selected keyword is extracted from the EPG and is provided to the audience.

However, the EPG is not necessarily configured to include only the information that accurately represents the television program contents. The use of inappropriate keywords may fail to retrieve appropriate television programs using keywords. Selection of keywords may or may not succeed in retrieving eligible television programs. For example, using the word "America" as a keyword fails to extract television programs containing the word (information) "USA" though these programs concern America.

DISCLOSURE OF THE INVENTION

The present invention has been made in consideration of the foregoing. It is therefore an object of the present invention to enable the audience to easily retrieve intended television programs and prevent a retrieved result from including inappropriate information.

A first information processing apparatus according to the present invention comprises: means for acquiring television program information including information concerning television program contents; means for extracting a characteristic word representing characteristics of the television program from the television program information; first means for creating a first file containing the characteristic word extracted from television program information about a plurality of television programs and providing the file to other apparatuses; and second means for, when receiving information from the other apparatuses, namely, information about a given characteristic word selected from the first file, providing the other apparatuses with television program information about a television program corresponding to the selected characteristic word.

A first information processing method according to the present invention comprises: a step of acquiring television program information including information concerning television program contents; a step of extracting a characteristic word representing characteristics of the television program from the television program information; a first step of creating a first file containing the characteristic word extracted from television program information about a plurality of television programs and providing the file to other apparatuses; and a second step of, when receiving information from the other apparatuses, namely, information about a given characteristic word selected from the first file, providing the other apparatuses with television program information about a television program corresponding to the selected characteristic word.

A first program according to the present invention allows a computer to perform: a step of acquiring television program information including information concerning television program contents; a step of extracting a characteristic word representing characteristics of the television program from the television program information; a first step of creating a first file containing the characteristic word extracted from television program information about a plurality of television programs and providing the file to other apparatuses; and a second step of, when receiving information from the other apparatuses, namely, information about a given characteristic word selected from the first file, providing the other apparatuses with television program information about a television program corresponding to the selected characteristic word.

A second information processing apparatus according to the present invention comprises: means for acquiring a television program ID for identifying a specific television program and television program information including information concerning television program contents; means for extracting a characteristic word representing characteristics of the television program from the television program information; first provision means for creating a first file containing the characteristic word extracted from television program information about a plurality of television programs and providing the file to other apparatuses; and means for associating the characteristic word with a television program ID of a television program information corresponding to each characteristic word for storage; and second provision means for, when receiving information from the other apparatuses, namely, information about a given characteristic word selected from the first file, referencing the association means, reading a television program ID associated with the selected characteristic word, and providing the other apparatuses with television program information corresponding to the television program ID.

The characteristic word extraction means can count the number of occurrences of a given word contained in each of the television program information and extracts a word having a large count value as the characteristic word.

The characteristic word extraction means can analyze a sentence contained in the television program information and extracts the characteristic word from a remaining part except a part corresponding to a specified prescription.

The characteristic word extraction means can extract a predetermined word as the characteristic word.

The characteristic word extraction means can prevent a predetermined word from being extracted as the characteristic word.

The characteristic word extraction means can determine whether or not a synonym is found in a plurality of words extracted as the characteristic words and, when a synonym is determined to be found, converts the extracted word into a specified word and extracts it as a characteristic word.

The first provision means can determine whether or not the first file already stores a characteristic word extracted by the characteristic word extraction means and, when already stored, does not add the characteristic word to the first file.

A second information processing method according to the present invention comprises: a step of acquiring a television program ID for identifying a specific television program and television program information including information concerning television program contents; a step of extracting a characteristic word representing characteristics of the television program from the television program information; a first step of creating a first file containing the characteristic word extracted from television program information about a plurality of television programs and providing the file to other apparatuses; and a step of associating the characteristic word with a television program ID of a television program information corresponding to each characteristic word for storage; and a second step of, when receiving information from the other apparatuses, namely, information about a given characteristic word selected from the first file, referencing the association step, reading a television program ID associated with the selected characteristic word, and providing the other apparatuses with television program information corresponding to the television program ID.

A second program according to the present invention comprises: a step of acquiring a television program ID for identifying a specific television program and television program information including information concerning television program contents; a step of extracting a characteristic word representing characteristics of the television program from the television program information; a first step of creating a first file containing the characteristic word extracted from television program information about a plurality of television programs and providing the file to other apparatuses; and a step of associating the characteristic word with a television program ID of a television program information corresponding to each characteristic word for storage; and a second step of, when receiving information from the other apparatuses, namely, information about a given characteristic word selected from the first file, referencing the association step, reading a television program ID associated with the selected characteristic word, and providing the other apparatuses with television program information corresponding to the television program ID.

A third information processing apparatus according to the present invention comprises: first means for receiving a file containing information about a characteristic word representing a characteristic of a television program; input means for allowing a user to select an intended characteristic word from characteristic words contained in the file; means for transmitting information about a characteristic word selected by the user to other apparatuses; and second means for receiving television program information about a television program corresponding to the selected characteristic word transmitted from the other apparatuses as a result of transmitting information about the selected characteristic word.

The first reception means can receive a file containing information about the characteristic word from the other apparatuses.

A third information processing method according to the present invention comprises: a first step of controlling reception of a file containing information about a characteristic word representing a characteristic of a television program; an input step of allowing a user to select an intended characteristic word from characteristic words contained in the file; a step of controlling transmission of information about a characteristic word selected by the user to other apparatuses; and a second step of controlling reception of television program information about a television program corresponding to the selected characteristic word transmitted from the other apparatuses as a result of transmitting information about the selected characteristic word.

A third program according to the present invention comprises: a first step of controlling reception of a file containing information about a characteristic word representing a characteristic of a television program; an input step of allowing a user to select an intended characteristic word from characteristic words contained in the file; a step of controlling transmission of information about a characteristic word selected by the user to other apparatuses; and a second step of controlling reception of television program information about a television program corresponding to the selected characteristic word transmitted from the other apparatuses as a result of transmitting information about the selected characteristic word.

According to the first information processing apparatus, the method thereof, and the program of the present invention, the apparatus extracts characteristic words representing the television program characteristic from the television program information including information about the television program contents. The apparatus creates a file from the extracted characteristic words and supplies it to the other apparatuses. The apparatus may receive information about a given characteristic word selected from the file of characteristic words. In this case, the apparatus provides the other apparatuses with the television program information about a television program corresponding to the selected characteristic word.

According to the second information processing apparatus, the method, and the software program of the present invention, the apparatus acquires television program IDs for identifying respective television programs and television program information including the information associated with the television program contents. The apparatus extracts characteristic words representing the television program characteristic from the television program information. The apparatus creates a file from the extracted characteristic words, supplies it to the other apparatuses, and associates the characteristic words with the television program IDs. The apparatus may receive information about a given characteristic word selected from the file of characteristic words. In this case, the apparatus provides the other apparatuses with the television program information corresponding to the television program ID associated with the selected characteristic word.

According to the third information processing apparatus, the method, and the software program of the present invention, the apparatus receives a file including the information about characteristic words representing the television program characteristic. The apparatus transmits information about the user-selected characteristic words out of those included in the file to the other apparatuses. As a result of the transmission, the apparatus receives the television program information about the television program from the other apparatuses.

BRIEF DESCRIPTION OF DRAWINGS

FIG. 1 shows the configuration of an embodiment of an information processing system according to the present invention;

FIG. 7 shows a television program information file 101;

FIG. 8 shows an association file 102;

FIG. 9 shows a characteristic word file 103;

BEST MODE FOR CARRYING OUT THE INVENTION

Embodiments of the present invention will be described in further detail with reference to the accompanying drawings. FIG. 1 shows the configuration of an embodiment of an information processing system according to the present invention. The information processing system in FIG. 1 provides users (audience) with information about television programs.

The information processing system in FIG. 1 comprises: a network 1 comprising the Internet, LAN (Local Area Network), and the like; a server 2 that is connected to the network 1 and provides users with information about television programs; a recording/reproducing apparatus 3 that is connected to the network 1, provides users with the information from the server 2, and provides the server 2 with instructions from the users; and a television receiver 4 that is connected to the recording/reproducing apparatus 3 and displays information about a television program and the television program itself.

Figure 2:
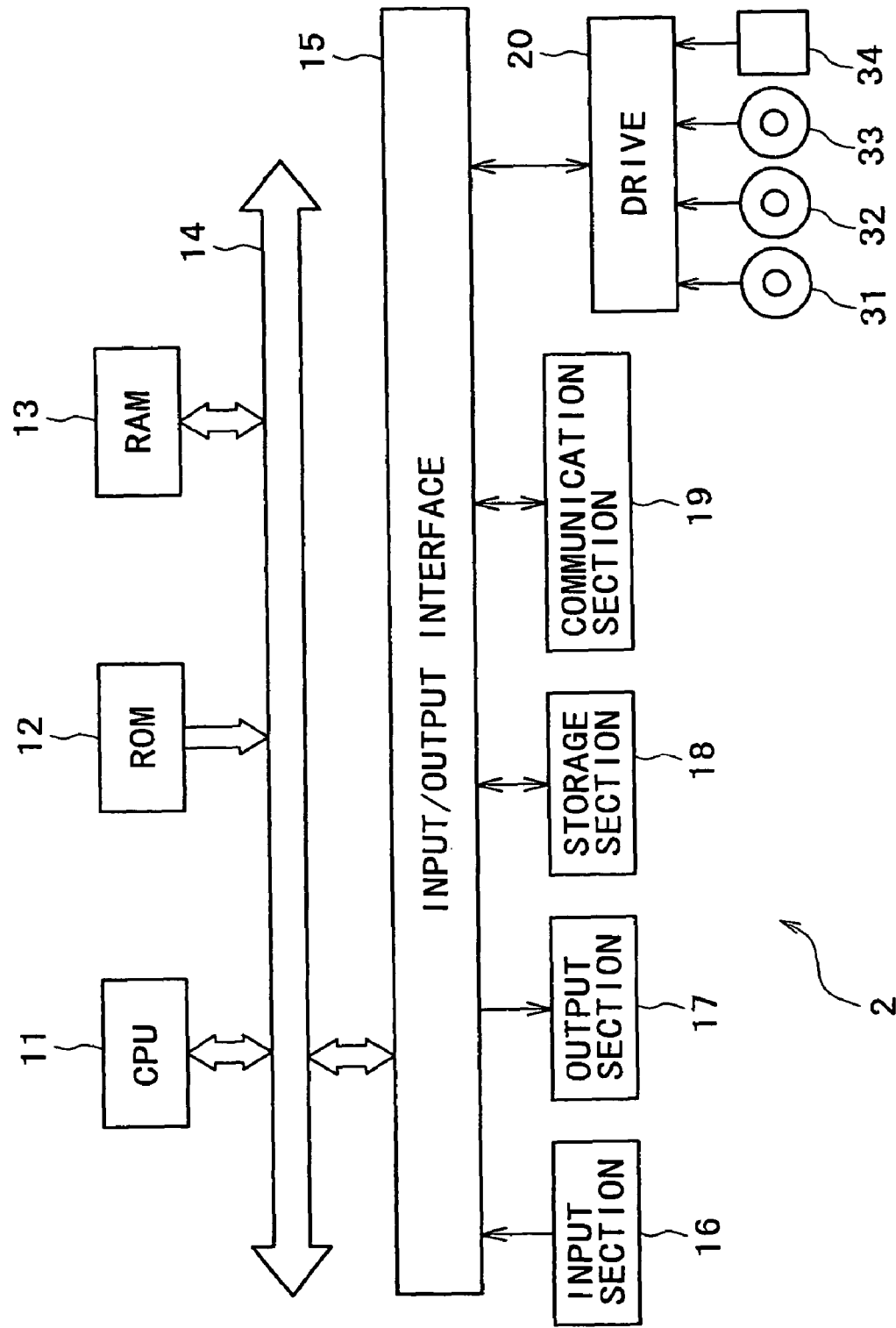
FIG. 2 shows an internal configuration example of a server 2.

FIG. 2 shows an internal configuration example of the server 2. The server 2 can comprise a computer such as a personal computer. The following describes the internal configuration example of the server 2 in FIG. 2. A CPU (Central Processing Unit) 11 of the server 2 performs various processes in accordance with a program stored in ROM (Read Only Memory) 12. RAM (Random Access Memory) 13 appropriately stores data and programs needed for the CPU 11 to perform various processes. An input/output interface 15 connects with an input section 16 comprising a keyboard and a mouse. When a signal is input to the input section 16, the input/output interface 15 outputs the signal to the CPU 11. The input/output interface 15 also connects with an output section 17 comprising a display and a speaker.

Further, the input/output interface 15 connects with a storage section 18 and a communication section 19. The storage section 18 comprises a hard disk and the like. The communication section 19 interchanges data with other apparatuses (e.g., recording/reproducing apparatus 3) via the network 1. A drive 20 is used to read data from or write data to recording media such as a magnetic disk 31, an optical disk 32, a magnetic optical disk 33, and semiconductor memory 34.

Figure 3:
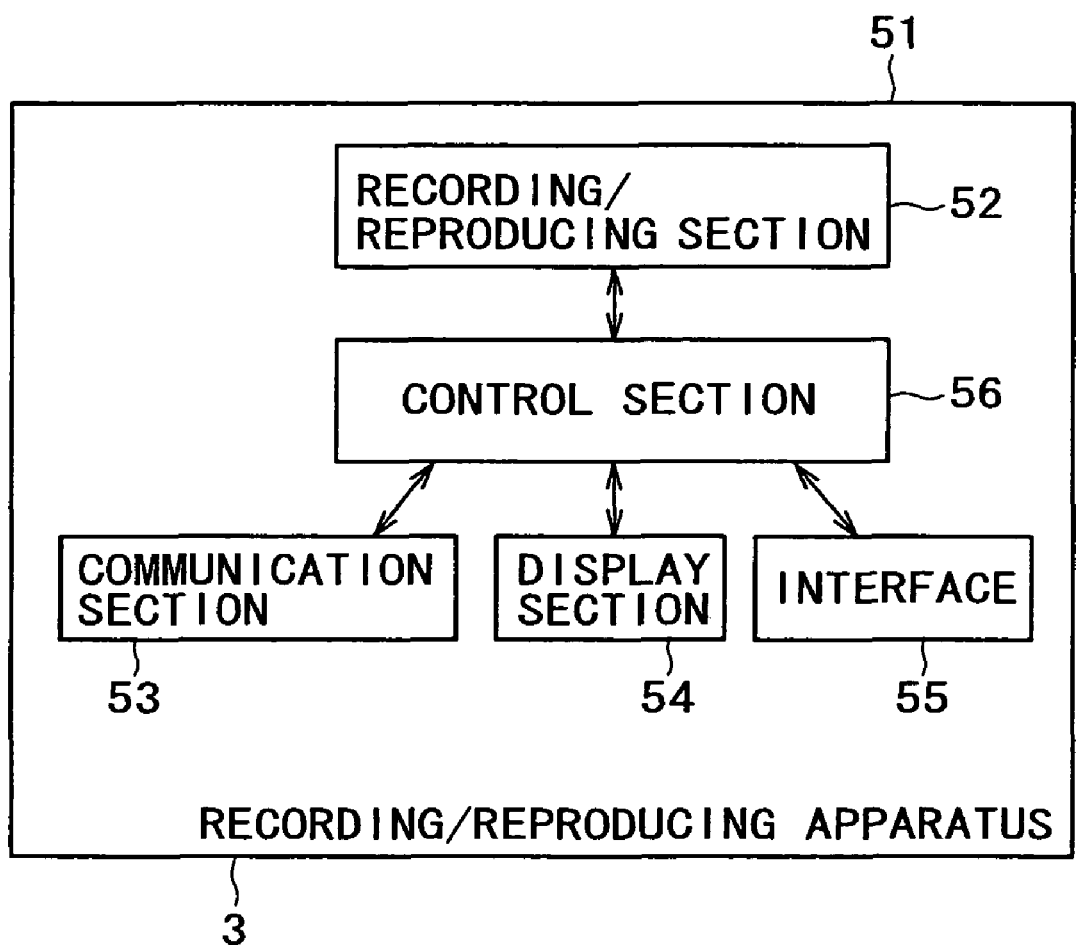
FIG. 3 shows an internal configuration example of a recording/reproducing apparatus 3.

FIG. 3 shows an internal configuration example of a recording/reproducing apparatus 3. The recording/reproducing apparatus 3 is also referred to as a video tape recorder (VTR) and has functions of recording video and audio and reproducing recorded video and audio. The embodiment can use a conventional technology of recording and reproducing video and audio and a detailed description is omitted for simplicity. Accordingly, FIG. 3 shows a recording/reproducing section 52, i.e., a single block to perform processes concerning recording and reproduction of video and audio.

A communication section 53 is provided to communicate with the other apparatuses via the network 1. A display section 54 comprises an LCD (Liquid Crystal Display) and the like. The display section 54 is provided to display information, i.e., the time and states of the recording/reproducing apparatus 3 such as reproduction and recording. An interface 55 is provided to interchange data with the television receiver 4.

A control section 56 controls the respective parts of a main body for the recording/reproducing apparatus 3. The recording/reproducing apparatus 3 comprises the main body 51 and a remote controller 71 (to be described) in FIG. 5, for example. The remote controller 71 supplies the main body 51 with user's instructions. The following description assumes that the communication section 53 not only interchanges data with the other apparatuses via the network 1, but also receives data from the remote controller 71. Infrared rays, radio, and the like are used for the communication between the main body 51 and the remote controller 71.

Figure 4:
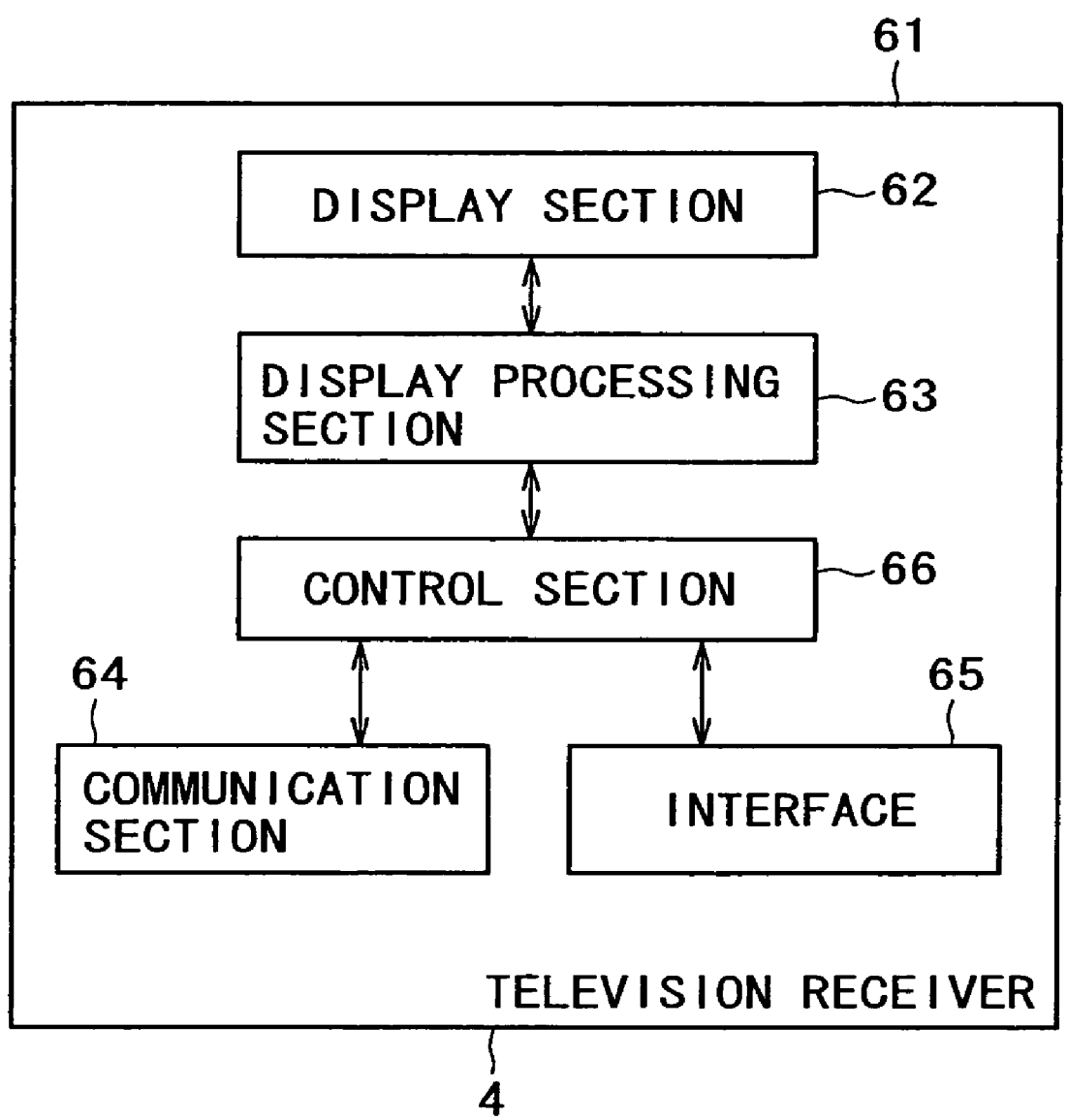
FIG. 4 shows an internal configuration example of a television receiver 4.

FIG. 4 shows an internal configuration example of the television receiver 4. The television receiver 4 has: a display section 62 comprising a cathode ray tube to display videos such as television program information; and a display processing section 63 to control displays of the display section 62. A communication section 64 receives data from the remote controller 71 that supplies a main body 61 with user's instructions. An interface 65 is provided to interchange data with the recording/reproducing apparatus 3. A control section 66 controls respective parts of the main body 61 of the television receiver 4.

Figure 5:
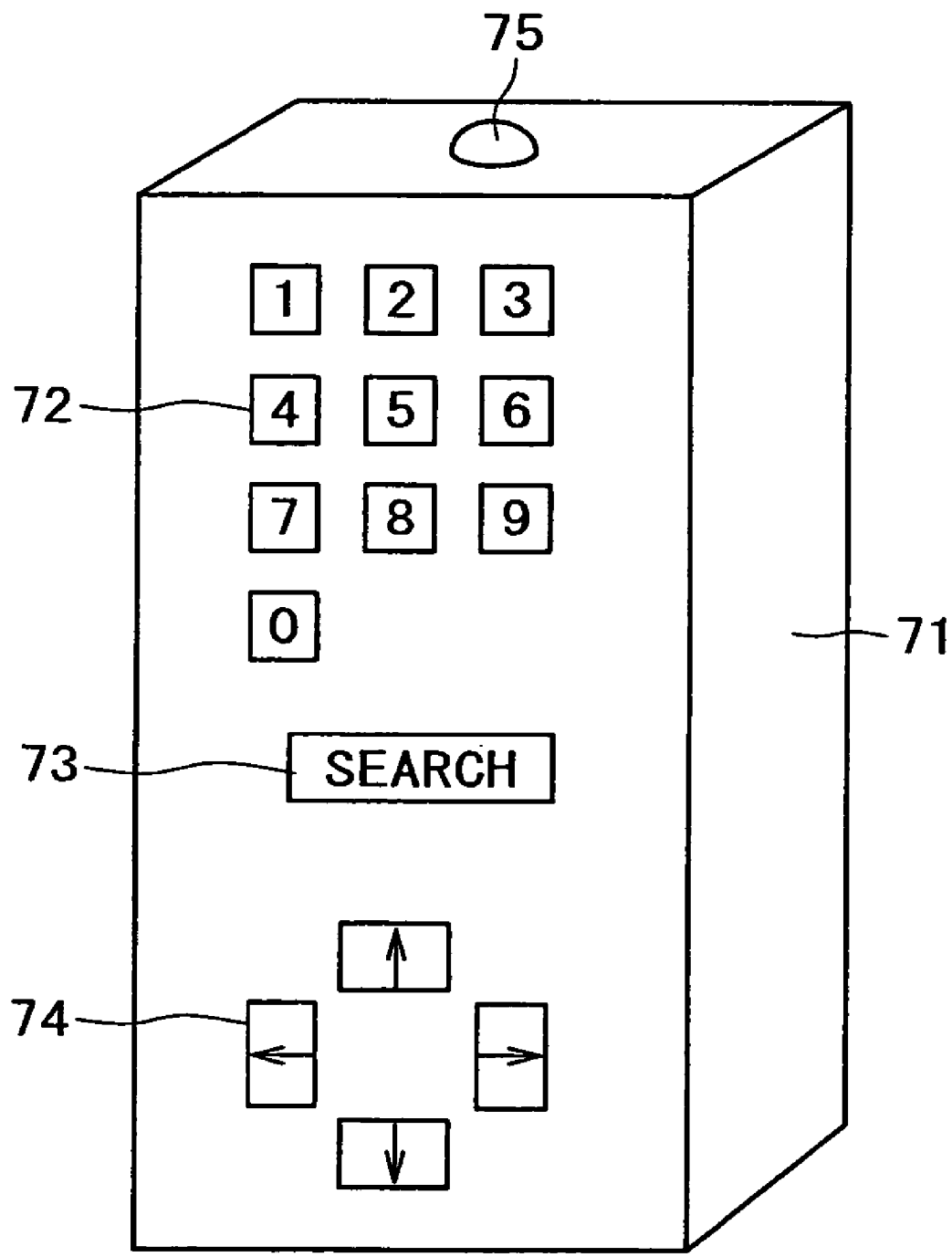
FIG. 5 shows a configuration example of a remote controller 71.

FIG. 5 shows a configuration example of the remote controller 71. The remote controller 71 may be an apparatus that supplies user's instructions to the recording/reproducing apparatus 3 or to the television receiver 4. Alternatively, the remote controller 71 may be provided as an apparatus common to both the recording/reproducing apparatus 3 and the television receiver 4.

For example, the remote controller 71 is provided with: a numeric keypad 72 to be operated to select channels; a search key 73 to be operated to search for television programs; and arrow keys 74 to be operated to move a displayed cursor. When these keys are operated, the communication section 75 outputs a signal to supply the user's instruction to the recording/reproducing apparatus 3 and the television receiver 4. In addition to the keys exemplified above, the other keys may be provided to perform the other processes.

Figure 6:
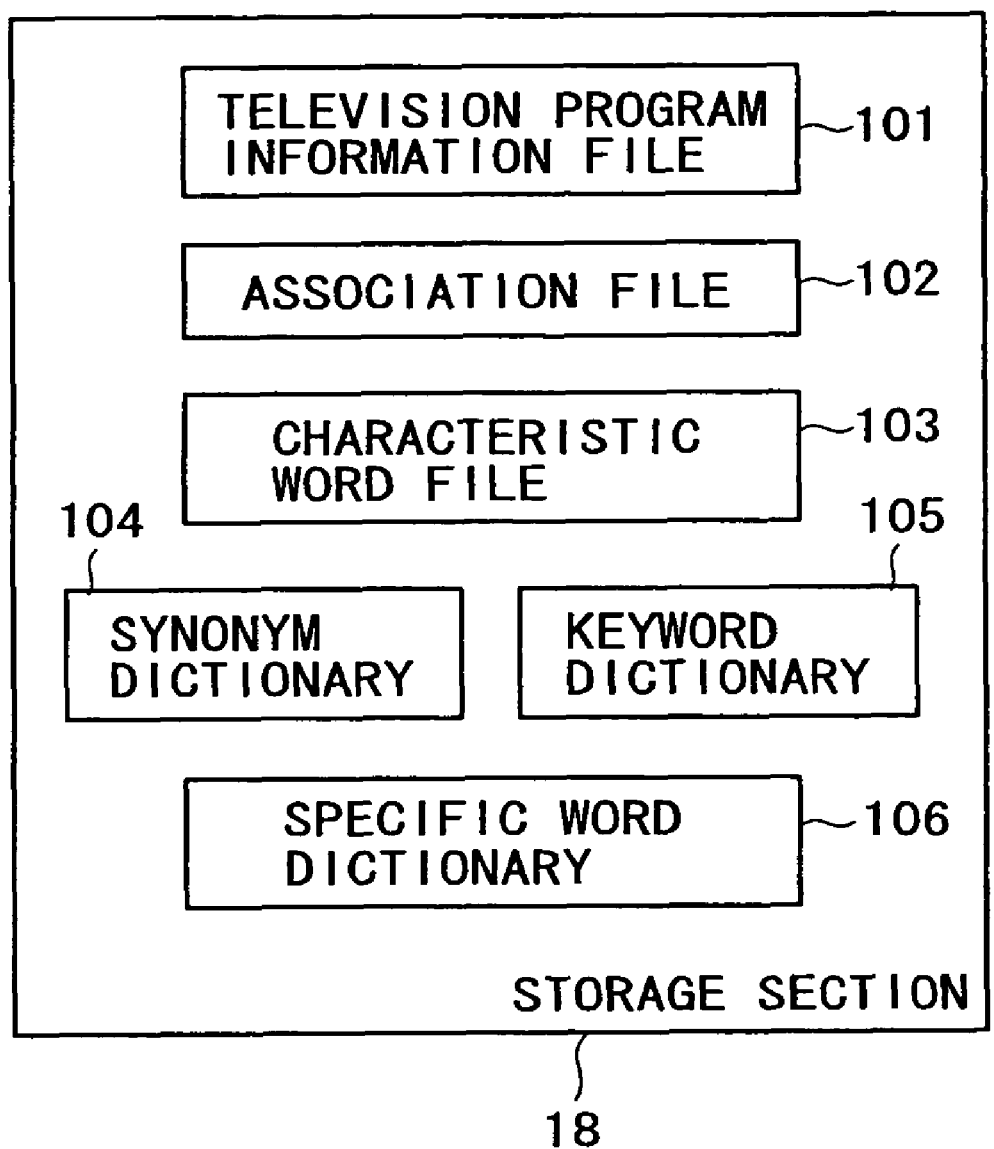
FIG. 6 shows files stored in a storage section 18.

FIG. 6 shows data stored in the storage section 18 (FIG. 2) of the server 2. A television program information file 101 contains EPG data itself received by the communication section 19 or data extracted from the EPG. As shown in FIG. 7, the television program information file 101 stores the following data associated with each other: a television program ID to identify each television program; a broadcast station; a broadcast date and time; a television program name; a television program content; a genre; and a function containing information indicating whether the broadcast is stereo or captioned.

The data in the television program information file 101 is acquired from the EPG and is updated when the EPG is distributed. For example, when the EPG is distributed three times a day, the data in the television program information file 101 is also updated three times a day.

As shown in FIG. 8, the association file 102 contains a television program ID and a characteristic word associated with each other. The characteristic word is extracted as a word characteristically representing the television program. The characteristic word is extracted according to a specified technique (to be described) after reference to "television program content" of the data stored in the television program information file 101. Further, it may be preferable to reference not only "television program content" but also "genre" and "function".

There may be television programs from which the specified technique (to be described) does not detect characteristic words. However, the embodiment need not detect characteristic words from all television programs. The association file 102 in FIG. 8 shows that one term "World Cup" is extracted as characteristic words of the television program with ID "0001". Likewise, characteristic words "fishing, black bass" are extracted for the television program with ID "0051". Characteristic words "fishing, sweetfish, Tama River" are extracted for the television program with ID "0052". Characteristic words "Kyojin, Hanshin" are extracted for the television program with ID "0100".

It is assumed that there are sequential IDs and no missing ID therebetween. The example in FIG. 8 shows that characteristic words for IDs 0002 through 0050 are not extracted. Further, as shown in FIG. 8, a plurality of words may be extracted for each characteristic word. Of course, it may be preferable to set limitations such as extracting only one or up to five characteristic words from one television program.

The characteristic word file 103 (FIG. 6) comprises only characteristic words. The characteristic word file 103 is composed of data extracted from the association file 102. FIG. 9 shows an example of data stored in the characteristic word file 103. The data in FIG. 9 is equivalent to data extracted from the association file 102 in FIG. 8.

The characteristic word file 103 in FIG. 9 stores such words as World Cup, fishing, black bus, sweetfish, Tama River, Kyojin, Hanshin, and the like. With reference to FIG. 8, for example, characteristic word "fishing" is common to both television programs with IDs "0051" and "0052". The characteristic word file 103 stores only one such common characteristic word, not two.

To create these files, the storage section 18 stores a synonym dictionary 104, a keyword dictionary 105, and a specific word dictionary 106. The example here assumes that the three dictionaries are stored. Further, it may be preferable to store the other dictionaries or no dictionaries.

The synonym dictionary 104 stores words having different forms but the same meaning such as "angling" and "fishing". These words are associated with each other. For example, if word "fishing" is contained in the "television program content" for a given television program, the word is assumed to be synonymous with "angling". Word "angling" is extracted as a characteristic word. That is to say, the synonym dictionary 104 is provided so as not to extract words having the same meaning as characteristic words.

In other words, the synonym dictionary 104 is provided for the following purpose. The characteristic word file 103 stores only unique words, not a plurality of different words having the same meaning. As a result, the audience can be provided with only unique words.

The keyword dictionary 105 stores words to be extracted as characteristic words in consideration for the common knowledge, current affairs, and the like. When the "television program content" contains a keyword stored in the keyword dictionary 105, that keyword is extracted as a characteristic word. In this example, it is assumed that the keyword dictionary 105 stores keywords to be extracted as characteristic words. By contrast, the keyword dictionary 105 may store words not extracted as characteristic words.

The specific word dictionary 106 stores words recommended to be provided for users so as to characterize television programs or rules to extract such words. For example, the specific word dictionary 106 stores names of opponent teams for television programs relaying baseball games, names of countries that produced movies for television programs, and the like. A server administrator of the server 2 configures the specific word dictionary 106 and the keyword dictionary 105. It is possible to use commercially available dictionaries for the synonym dictionary 104.

These dictionaries are updated as needed. Particularly, it is preferable to periodically update the keyword dictionary 105 since it stores words associated with current affairs.

Figure 10:
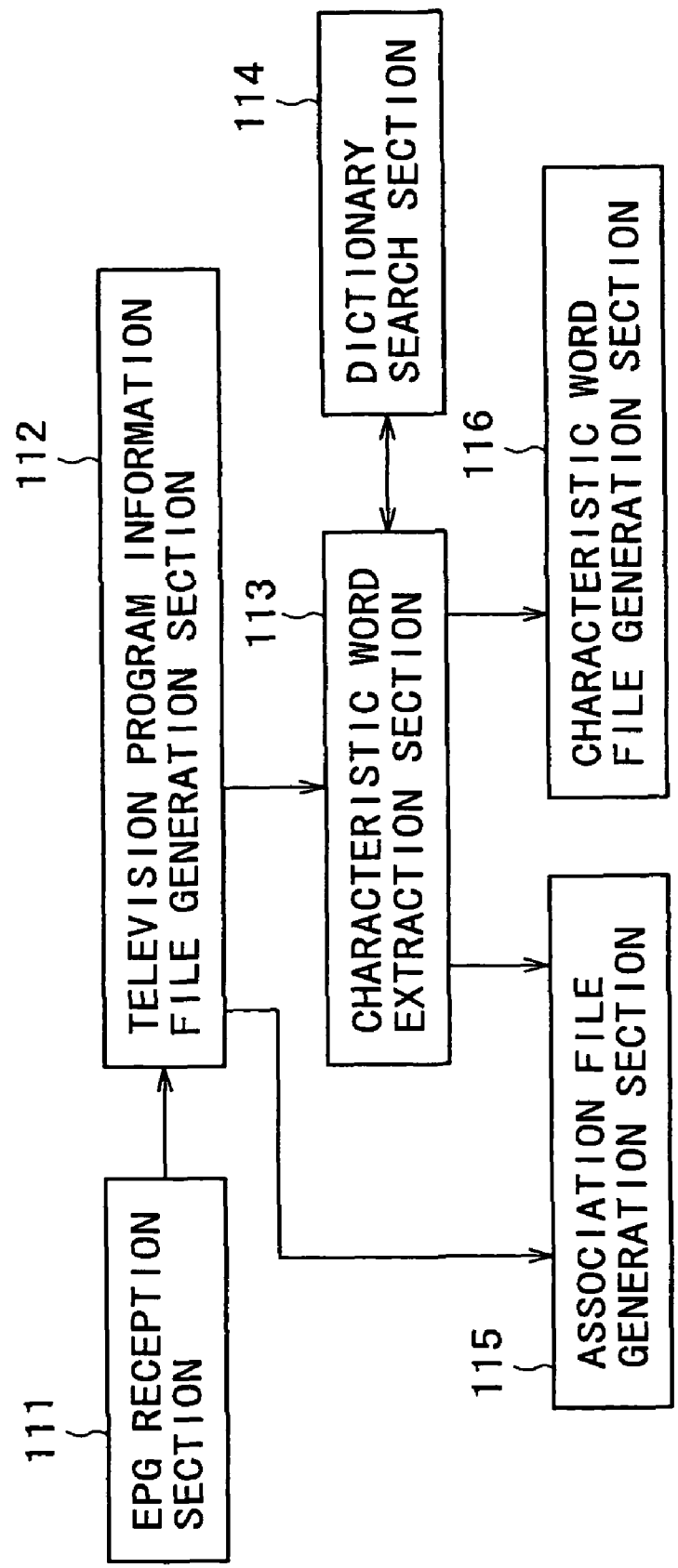
FIG. 10 is a functional block diagram of a server 2.

FIG. 10 is a functional block diagram of the server 2. For example, a program is stored in the ROM 12 or the storage section 18. When the program starts, the CPU 11 performs processes in accordance with the program to implement functions of the respective blocks. An EPG reception section 111 controls reception of the EPG received by the communication section 19. When the EPG is received, the EPG reception section 111 supplies the received EPG data to a television program information file generation section 112.

The television program information file generation section 112 generates television program information from data in the EPG supplied from the EPG reception section 111. The television program information may be EPG data itself or specific information extracted from the EPG data. The generated television program information is stored as the television program information file 101 in the storage section 18.

The television program information generated by the television program information file generation section 112 is supplied to the characteristic word extraction section 113 and an association file generation section 115. The characteristic word extraction section 113 extracts characteristic words from the supplied television program information in accordance with a specified technique. When extracting characteristic words, the dictionary search section 114 searches the synonym dictionary 104, the keyword dictionary 105, or the specific word dictionary 106. The dictionary search section 114 supplies a result to the characteristic word extraction section 113.

Characteristic words extracted by the characteristic word extraction section 113 are supplied to the association file generation section 115 and the characteristic word file generation section 116. The association file generation section 115 extracts television program IDs from the supplied television program information. The association file generation section 115 associates the extracted television program ID with the supplied characteristic word to generate an association file 102 and stores it in the storage section 18.

The characteristic word file generation section 116 generates the characteristic word file 103 from characteristic words extracted by the characteristic word extraction section 113. The characteristic word file generation section 116 then stores the generated characteristic word file 103 in the storage section 18.

Figure 11:
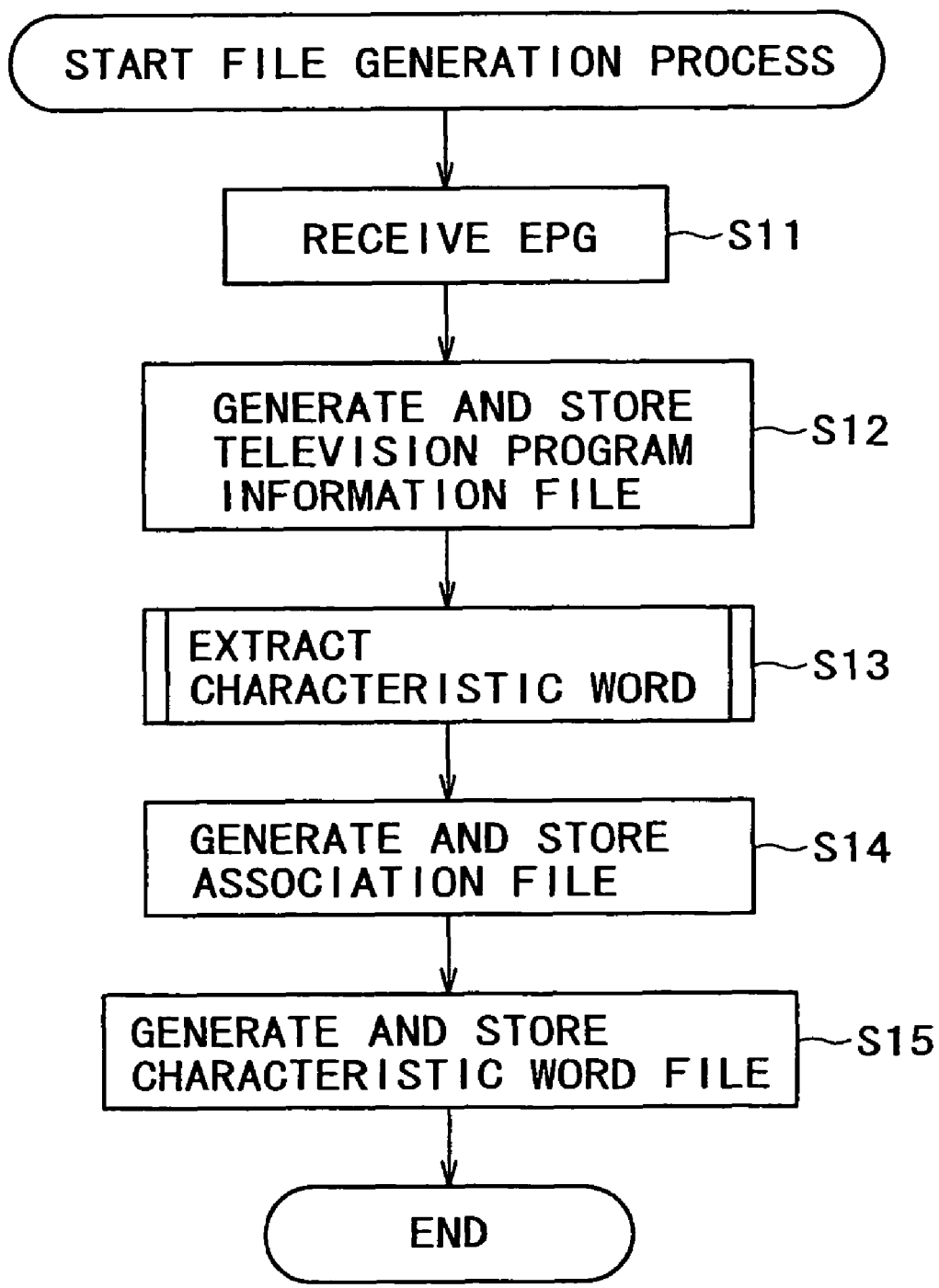
FIG. 11 is a flowchart showing a process of creating files.

With reference to the flowchart in FIG. 11, the following describes a process according to the functional block diagram in FIG. 10, i.e., the generation process for the respective files. At step S11, the EPG data is received under control of the EPG reception section 111. When the EPG data is received, the process starts at step S12 and later. At step S12, the television program information file generation section 112 generates the television program information from the received EPG data.

The generated television program information includes at least data stored as the television program information file 101 (FIG. 7) in the storage section 18. The generated television program information is stored in the storage section 18 and is supplied to the characteristic word extraction section 113 and the association file 115. At step S13, the characteristic word extraction section 113 extracts characteristic words.

Figure 12:
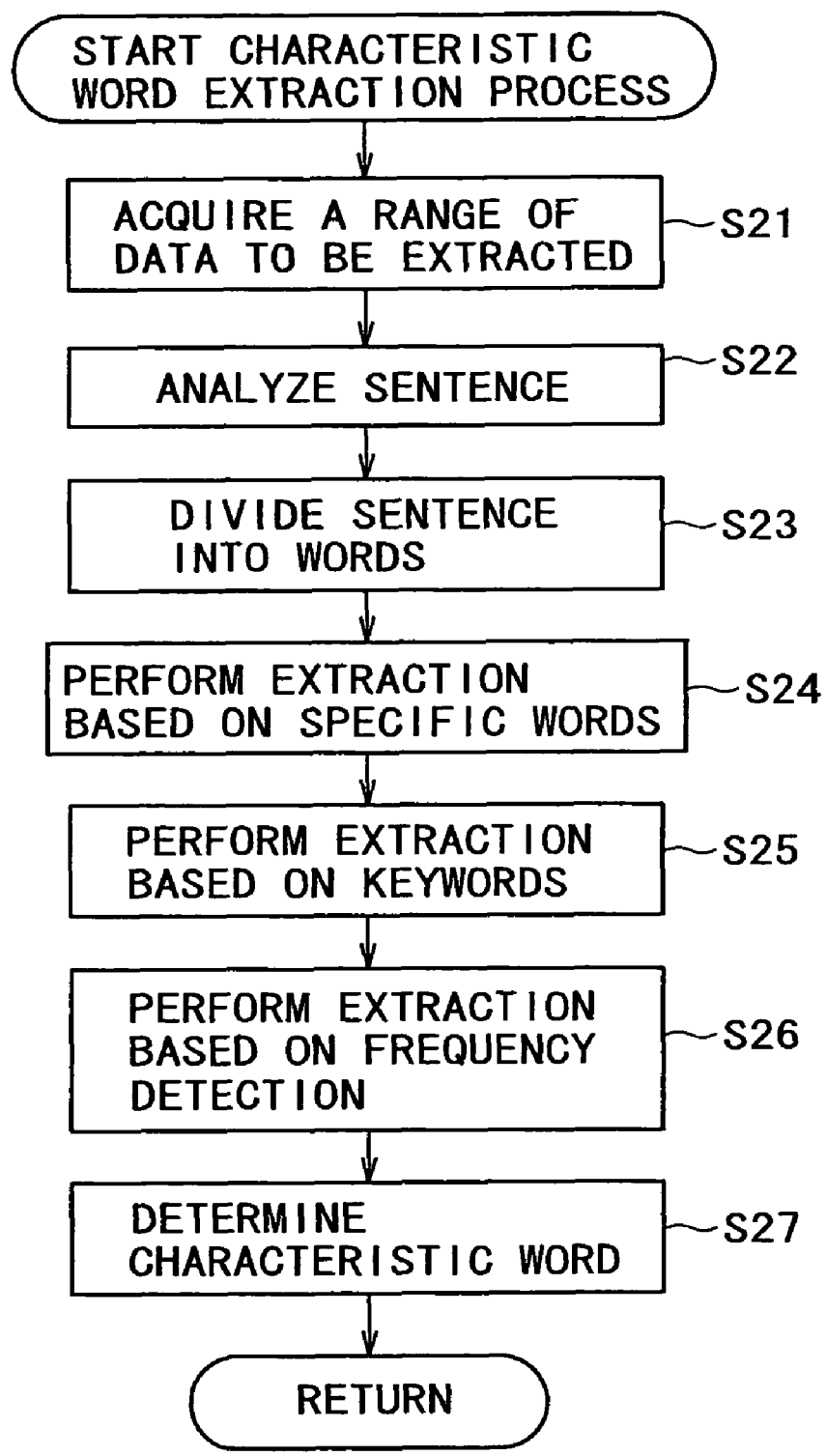
FIG. 12 is a flowchart showing in detail an extraction process using characteristic words at step S13.

Referring now to the flowchart in FIG. 12, the following describes in detail the process of extracting characteristic words performed at step S13. The characteristic word extraction process based on the flowchart in FIG. 12 is performed for every one of television programs.

At step S21, the characteristic word extraction section 113 acquires a range of data to be extracted as characteristic words from the television program information generated by the television program information file generation section 112. The range of characteristic words to be extracted may be limited to the television program contents only. The range may include the other information such as television program names and genres in addition to the television program contents.

After the range of data to be processed is acquired at step S21, a sentence is analyzed at step S22. During the sentence analysis at step S22, for example, the process extracts, for example, the narration (quoted part) included in the television program content and excludes the narration from the extraction process. It is assumed that words included in the narration hardly represent the contents of the television program properly. For this reason, the sentence analysis is performed to prevent words in the narration from being extracted as characteristic words.

That is to say, the statement analysis process at step S22 at least includes a process of excluding parts of the sentence containing words inappropriate for characteristic words if extracted. It may be preferable to perform another analysis process different from the statement analysis that excludes the narration part from the extraction process as mentioned above. A plurality of processes may be combined for the analysis. Further, the statement analysis may be performed to extract characteristic words.

The following description assumes that the statement is analyzed so as to exclude parts containing words inappropriate for characteristic words. Upon completion of step S22, the process proceeds to step S23. The process divides the part of the sentence into words. That part is devoid of the part excluded from the process and corresponds to the remaining part eligible for the process.

The process extracts nouns from the divided words. The extracted nouns are supplied to the dictionary search section 114. The example here extracts only nouns from the divided words because nouns are most appropriate words for expressing characteristics of a television program.

The television program contents include many adjectives. In other words, adjectives are often used to represent the television program characteristics. However, adjectives are too generic and therefore are inappropriate information for retrieving intended television programs the audience wants to watch and listen to. For example, the adjective "amusing" can be used like "amusing television program" and is supposed to be often used as the television program content (advertising statement of the television program). On the other hand, it is generally impractical to consider that the television program content includes such an expression as "unenjoyable television program".

That is to say, the word "enjoyable" is commonplace. If the word "enjoyable" is provided as a characteristic word for retrieving television programs, the audience is given a meaningless word. If this word is used for retrieval, it is expected that the audience is provided with many television programs as a retrieval result. It is considered that adjectives are hardly available as meaningful words for the retrieval process.

The embodiment is described on the premise that adjectives are not extracted as characteristic words for the above-mentioned reason. Of course, there may be an embodiment that allows adjectives to be extracted. It may be preferable to extract also adjectives during the process at step S23. In this case, the subsequent process may be configured to remove commonplace adjectives and extract specified ones.

With respect to verbs, it may be preferable to extract the verb "run" as a synonym for the noun "marathon", for example. That is to say, after the sentence is divided into words at step S23, it may be preferable to extract verbs in addition to nouns as words to be passed to the subsequent process. In this case, an extracted verb is converted into a noun and is provided to the audience instead of providing the extracted verb as is. In this manner, the uniqueness can be given to words provided to the audience, making it possible to provide the audience with an easier-to-use system.

The process to convert verbs into nouns may be allocated to step S23 or step S24 and any steps later on. When verbs are converted into nouns as mentioned above, the characteristic word extraction section 113 divides a sentence into words. As a result, the dictionary search section 114 is supplied with words, i.e., verbs in this case. The dictionary search section 114 searches the synonym dictionary 104 (FIG. 6) and reads associated nouns.

The search result is supplied to the characteristic word extraction section 113. A search result may provide no associated nouns. In such case, the verb itself may or may not be adopted as a characteristic word. The description here assumes that parts of speech other than the noun, adjective, and verb are excluded from the process at step S23.

As mentioned above, the process at step S23 divides the sentence into words. The process at step S24 and later is applied to words selected for the process. At step S24, the characteristic word extraction section 113 performs the extraction based on specific words. The specific words are stored in the specific word dictionary 106 and represent baseball team names, country names, and the like. These words may be stored as specific words in the specific word dictionary 106. Further, when processing such phrase as "Kyojin versus Hanshin", for example, the specific word dictionary 106 may store a rule to extract nouns before and after the word "versus".

At step S24, the process extracts characteristic words in accordance with words or a rule stored in the specific word dictionary 106. At step S25, the process extracts keywords. Words to be extracted as characteristic words may be those divided at step S23 and selected for the process or may be those extracted as a result of extraction based on specific words at step S24.

The keywords are stored in the keyword dictionary 105 (FIG. 6) and represent the common knowledge and current affairs as mentioned above.

When a word stored in the keyword dictionary 105 matches a word selected for the process, that word is extracted as a characteristic word. By contrast, there may be a case where a word stored in the keyword dictionary 105 does not match. In such case, that word may be configured not to be extracted as a characteristic word, i.e., as a word not selected for the process. Which technique to select is a matter of the system design. It is preferable to adopt either technique suitable for the system.

It may be preferable to categorize words stored in the keyword dictionary into two types for the extraction process. In this case, one type is configured to include words to be treated as characteristic word; and the other not.

Upon completion of the extraction based on keywords at step S25, the process performs the extraction based on frequency detection at step S26. Words used to extract characteristic words may be those divided and selected for the process at step S23 or may be only those extracted based on the keywords at step S25.

During the extraction based on the frequency detection, the process detects the frequency of occurrences of a word selected for the process. A word, if used more than once, is considered to represent the characteristic of the television program. That word is extracted as a characteristic word. In this case, it is necessary to define the minimum frequency such as twice so that a word is extracted as a characteristic word if that word is used twice or more.

During the extraction based on the frequency detection, a plurality of words may be extracted as characteristic words for one television program. In this case, it may be preferable to unlimitedly extract a word whose frequency exceeds the predetermined minimum value. Alternatively, it may be preferable to limit the number of words to be extracted such as up to three per television program. When the limit is provided, it is desirable to preferentially extract the word having the highest frequency.

Based on the characteristic words extracted in this manner, the process determines the characteristic words that are actually associated with the television program ID and are stored in the association file 102. Let us consider an example of determining characteristic words at step S27 when characteristic words are extracted after specified steps and are ready to be processed at the subsequent steps. As the steps proceed, the characteristic words are selected and decreased. In this case, the process determines the final characteristic words remaining at the point of termination of the process at step S26.

There may be another case where characteristic words are extracted after specified steps and are not ready to be processed at the subsequent steps. In other words, words extracted at the respective steps are temporarily assumed to be characteristic words independently of each other. Thereafter, the determination process at step S27 determines the final characteristic words. In this case, there are some possible solutions. One solution is to assume all words extracted at the steps to be the final characteristic words. Another solution is to determine the specified number of characteristic words out of those extracted at the steps. In this case, the characteristic words are determined randomly or based on a specific rule such as selecting words each consisting of up to three characters. Still another solution is to determine the characteristic words that are extracted more than once out of all the words extracted at the steps so far.

Any determination techniques may be embodied. It just needs to provide a scheme that extracts words suited for the system and deserved to be characteristic words supplied to the audience. The synonym dictionary 104 is appropriately referenced at each step so as to prevent words having the same meaning from being selected and to perform the process based on one unique word.

According to the description with reference to the flowchart in FIG. 12, the process includes a plurality of extraction processes: the extraction based on specific words at step S24; the extraction based on keywords at step S25; the extraction based on the frequency detection at step S26; and the extraction based on the statement analysis requiring extractions as needed. Only one of these extraction processes may be used to implement the characteristic word extraction process. Alternatively, two or three extraction processes may be used to implement the characteristic word extraction process.

In the above-mentioned embodiment, the server 2 extracts characteristic words. Further, an administrator of the server 2 may provide characteristic words for each television program. In this case, the administrator provides words representing the television program characteristics by referring to the television program contents included in the EPG.

Instead of the administrator of the server 2, an EPG distributor may provides characteristic words. In this case, the EPG itself contains data related to the characteristic words. That is to say, the association file 102 and the characteristic word file 103 are included in the EPG and are distributed together.

The process proceeds to step S14 in FIG. 11 when extracting and determining the characteristic words, or when receiving data concerning the characteristic words. At step S14, the association file 102 is generated and is stored in the storage section 18. The association file generation section 115 (FIG. 10) performs the process at step S14. The association file generation section 115 associates a characteristic word with a television program ID. The characteristic word is extracted and determined by the characteristic word extraction section 113. The television program ID corresponds to the television program content for which the characteristic word is extracted. The television program ID is extracted from the television program information generated by the television program information file generation section 112.

The association file generation section 115 generates the association file 102 comprising IDs and characteristic words associated with each other. While the association file 102 is generated, the characteristic word file generation section 116 generates the characteristic word file 103 at step S15.

The characteristic word file generation section 116 sequentially stores characteristic words output from the characteristic word extraction section 113 in the form of the characteristic word file 103. When sequentially storing characteristic words, the characteristic word file generation section 116 determines whether or not a supplied characteristic word is already found in the already stored words. The characteristic word file generation section 116 stores the characteristic word only when determining that the word is not stored yet. This can prevent the same word from being stored more than once in the characteristic word file 103.

The characteristic word file generation section 116 stores the stored characteristic words as the characteristic word file 103 in the storage section 18. This is performed when the characteristic word extraction section 113 stops supplying data for characteristic words, i.e., upon completion of the process for data included in the received EPG.

Figure 13:
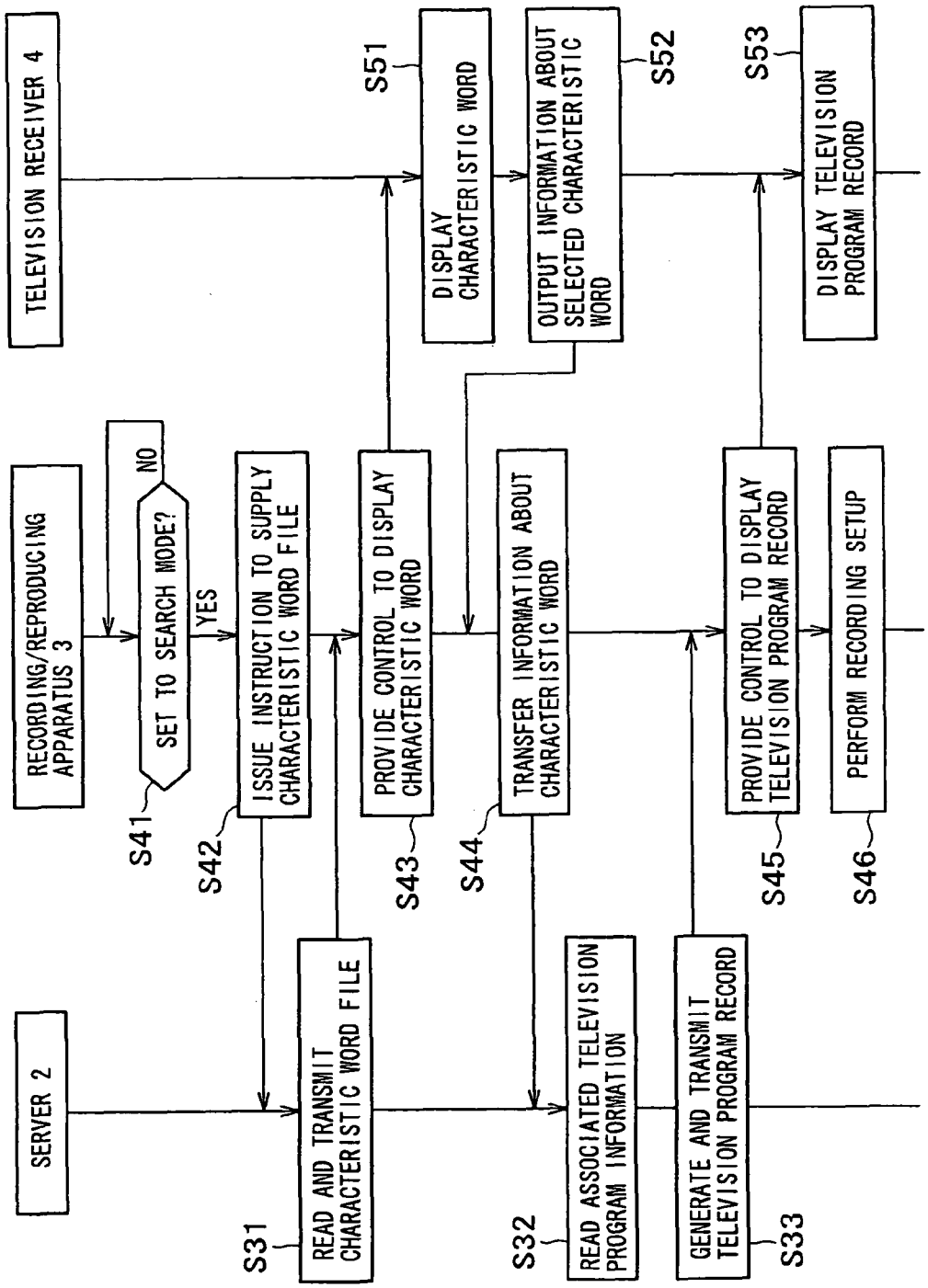
FIG. 13 is a flowchart showing a process for retrieving television programs.

Referring now to the flowchart in FIG. 13, the following describes a process using the file generated in this manner, specifically, a process of searching for television programs the audience wants to watch and listen to. At step S41, the recording/reproducing apparatus 3 determines whether or not it is set to search mode. The recording/reproducing apparatus 3 enables the search mode by receiving a signal output from the remote controller 71 (FIG. 5) when its search key 73 is operated.

The audience enables the search mode to search for a television program intended for watching and listening. The description here presents an example of the search mode to use characteristic words for search. Further, available search modes allow a search by genres, a search by using the EPG as is, and the like. It is desirable to provide a scheme that permits the audience to select these modes. When a plurality of search modes are enabled, one of them also includes the search mode based on characteristic words. At step S41, the process determines whether or not that search mode is selected.

When it is determined that the search mode based on characteristic words is selected, the process proceeds to step S42. The recording/reproducing apparatus 3 issues an instruction to the server 2 connected to the network 1 so as to supply the characteristic word file 103. When receiving the instruction, the server 2 reads the characteristic word file 103 from the storage section 18 (FIG. 6) at step S31. The server then transmits the characteristic word file 103 to the recording/reproducing apparatus 3 that issued the instruction.

At step S43, the recording/reproducing apparatus 3 starts control so as to allow the television receiver 4 to display characteristic words included in the received characteristic word file 103. While the recording/reproducing apparatus 3 starts the control of displaying characteristic words, the television receiver 4 uses the display section 62 to display the characteristic words at step S51.

Figure 14:
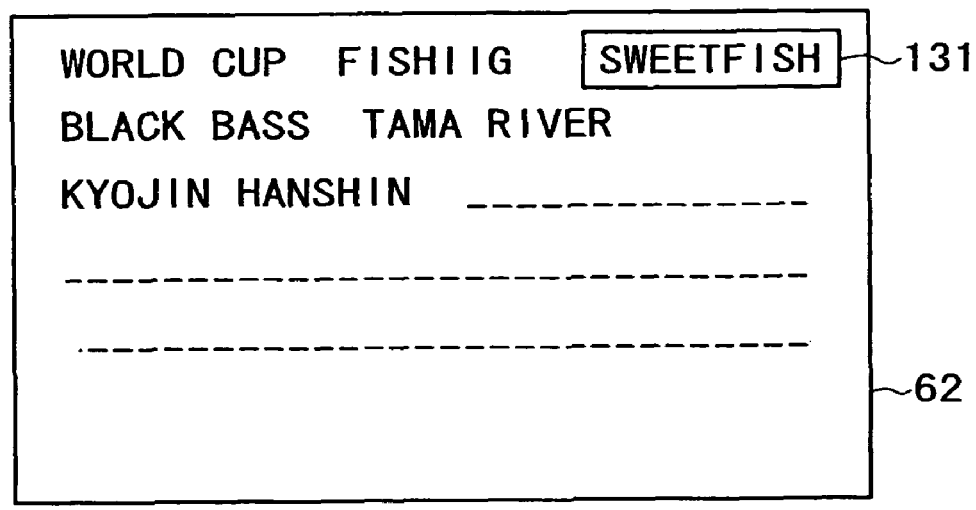
FIG. 14 shows a display of characteristic words.
Figure 15:
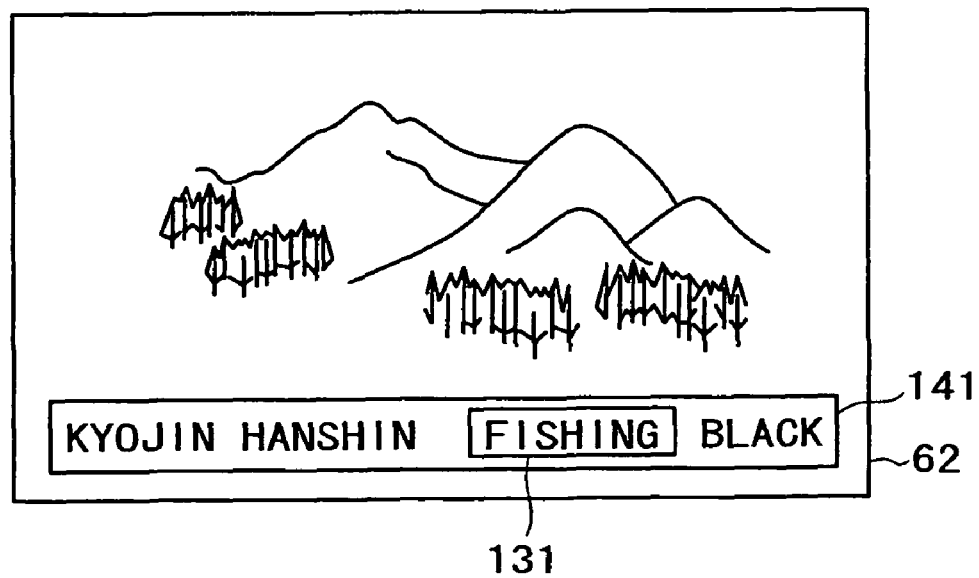
FIG. 15 shows another display of characteristic words.

FIGS. 14 and 15 show examples of displaying characteristic words. In the example of FIG. 14, the display section 62 of the television receiver 4 displays only characteristic words. That is to say, when the search mode is enabled, the screen displayed at that point changes to another screen displaying only characteristic words. A cursor 131 is positioned to one of characteristic words displayed. FIG. 14 shows that the cursor 131 is positioned to a characteristic word "sweetfish".

The cursor 131 may be formed in a graphic symbol such as a quadrangle enclosing the characteristic word. Alternatively, the cursor 131 may be displayed in such a manner as changing or inverting the color of only a word where the cursor 131 is positioned so as to distinguish the focused word from the other words. The audience can move the cursor 131 to an intended word by operating the arrow key 74 of the remote controller 71.

When the cursor 131 is positioned to an intended word, the audience can select that word to be used for the television program search. To do this, the audience performs a specified operation such as operating the search key 73 or a submit key (not shown). Such operation is predetermined to issue a determination instruction.

FIG. 15 is another example of displaying characteristic words. In the example of FIG. 15, a currently broadcast television program is displayed. That is to say, the video displayed at that point remains being displayed. A telop display section 141 is displayed over the screen for the television program. The telop display section 141 sequentially displays characteristic words. The characteristic words are sequentially displayed so that they scroll from the right to the left in FIG. 15.

The cursor 131 can be also positioned to a characteristic word displayed in the telop display section 141. The audience can move the cursor 131 to an intended characteristic word. Alternatively, the cursor 131 can be fixed to the center of the telop display section 141. While the characteristic words are sequentially displayed, a characteristic word reaching the center becomes selectable. When the selectable word is an intended one, the audience can perform a specified operation to select that word to be used for the television program search.

The description here assumes that the display section 62 of the television receiver 4 displays characteristic words. Further, the display section 54 of the recording/reproducing apparatus 3 may display characteristic words. When the display section 54 of the recording/reproducing apparatus 3 displays characteristic words, the display section 54 may display characteristic words in the same manner as the telop display section 141 as shown in FIG. 15, for example.

Further, the remote controller 71 may be provided with a display section (not shown) comprising a relatively large LCD. In this case, the display section may display characteristic words.

There may be provided a scheme that allows the audience to select only one characteristic word or a plurality of characteristic words. When there is provided the scheme that allows the audience to select a plurality of characteristic words, the audience selects words using the above-mentioned operations. The selected words can be displayed in an upper part of the display section 62 so as to be distinguished from the other selectable characteristic words. Let us assume that the audience selects a plurality of words and determines to select no more words. In this case, the scheme allows a specified operation such as operating the submit key (not shown) to finalize the selection.

Let us consider that the audience selects an intended word from the displayed characteristic words. At step S52, the information about the selected characteristic word is output to the recording/reproducing apparatus 3. At step S44, the recording/reproducing apparatus 3 receives the information about the selected characteristic word and transfers the information to the server 2 via the network 1.

At step S32, the server 2 searches the association file 102 based on the received information about the characteristic word. The server 2 then reads an ID of the television program associated with the characteristic word. For example, when the audience selects a word "sweetfish", searching the association file 102 reads the television program ID that specifies the word "sweetfish" as a characteristic word. In this case, a plurality of IDs may be read.

When the ID is read from the association file 102, searching the television program information file 101 reads television program information associated with the read ID. When a plurality of IDs are read, a plurality of pieces of television program information are read. At step S33, the server 2 generates a television program record. The television program record is equivalent to an EPG comprising only the read television program information.

The generated television program record is transmitted to the recording/reproducing apparatus 3. At step S45, the recording/reproducing apparatus 3 controls the display of the television program record. When the recording/reproducing apparatus 3 starts controlling the display of the television program record, the display section 62 of the television receiver 4 displays the television program record (step S53). The television program record is displayed like the display examples of characteristic words as shown in FIGS. 14 and 15. That is to say, the television program record may be displayed on the entire screen or in the telop form.

The audience references the displayed television program record and determines a television program to watch or listen to. The audience reserves that television program for watching and listening or recording as needed. When the television program is reserved for recording, the recording/reproducing apparatus 3 performs the recording setup. The audience can use the displayed television program record for the recording setup.

There have been described the recording/reproducing apparatus 3 and the television receiver 4 as separate apparatuses in the above-mentioned embodiment. In addition, the present invention can be applied to an integrated apparatus. The television receiver 4 may perform the processes to be performed by the recording/reproducing apparatus 3 in the above-mentioned description. Further, apparatuses such as a set-top box (STB) and a tuner may perform the above-mentioned processes to be performed by the recording/reproducing apparatus 3 and the television receiver 4.

According to the embodiment, characteristic words are provided for the audience to retrieve a television program intended for watching and listening. The characteristic words are extracted from the information about the television program and are given limitations during the extraction. Consequently, it becomes possible to prevent the audience from being provided with words not appropriately representing the television program contents.

No characteristic word can be extracted from a television program that has no words characterizing the television program. It is possible to exclude characterless television programs from the television programs intended for the search by the audience. Accordingly, it is possible to provide a system that can prevent too much information from being supplied to the audience and allow the audience to accurately, easily, and efficiently search for television programs.

According to the embodiment, the one server 2 not only extracts and stores characteristic words, but also extracts television program information corresponding to the characteristic word selected by the recording/reproducing apparatus 3. However, the present invention is not limited to this configuration. For example, a second server may be provided in addition to the first server 2 that extracts and stores characteristic words, and transmits the characteristic word file to the recording/reproducing apparatus 3. According to this configuration, the second server follows a selection result from the recording/reproducing apparatus 3 and extracts television program information corresponding to the selected characteristic word.

In this case, like the above-mentioned embodiment, the recording/reproducing apparatus 3 receives the characteristic word file created by the first server 2, presents characteristic words included in the file to a user for the purpose of selection, and transmits the information concerning the selection result to the second server. The second server extracts television program information corresponding to the characteristic word selected by the user using the recording/reproducing apparatus 3. The second server then transmits the extracted television program information to the recording/reproducing apparatus 3.

A series of the above-mentioned processes can be implemented not only by the hardware having the corresponding functions, but also by the software. When the software is used to perform the series of processes, software programs constituting the software are installed in a computer from recording media. The computer may be built in the special hardware. Alternatively, the computer may be, for example, a general-purpose personal computer where various programs can be installed to perform various functions.

As shown in FIG. 2, recording media are configured independently of the personal computer (e.g., the server 2 in this case). The recording media include, for example, package media that record software programs and are distributed to supply the software programs to users. The package media comprise: the magnetic disk 31 (including flexible disks); the optical disk 32 including CD-ROM (Compact Disc-Read Only Memory) and DVD (Digital Versatile Disc); the magnetic optical disk 33 including MD (Mini-Disc, registered trademark); and the semiconductor memory 34. In addition, the recording media are also preinstalled in the computer to be supplied to users and store the software programs. In this case, the recording media comprise the ROM 12 and a hard disk including the storage section 18.

In this specification, the steps describe the software programs supplied from the recording media and include chronological processes in accordance with the described sequences. Furthermore, the steps also include processes that are not performed chronologically, but concurrently or individually.

In the specification, the system represents the entire apparatus that comprises a plurality of apparatuses.

INDUSTRIAL APPLICABILITY

According to the first information processing apparatus, the method, and the software program of the present invention, the apparatus extracts characteristic words representing the television program characteristic from the television program information including information about the television program contents. The apparatus creates a file from the extracted characteristic words and supplies it to the other apparatuses. The apparatus may receive information about a given characteristic word selected from the file of characteristic words. In this case, the apparatus provides the other apparatuses with the television program information about a television program corresponding to the selected characteristic word. It is possible to provide the scheme capable of allowing users to easily search for a television program intended for watching and listening and information about the television program.

Further, according to the second information processing apparatus, the method, and the software program of the present invention, the apparatus acquires television program IDs for identifying respective television programs and television program information including the information associated with the television program contents. The apparatus extracts characteristic words representing the television program characteristic from the television program information. The apparatus creates a file from the extracted characteristic words, supplies it to the other apparatuses, and associates the characteristic words with the television program IDs. The apparatus may receive information about a given characteristic word selected from the file of characteristic words. In this case, the apparatus provides the other apparatuses with the television program information corresponding to the television program ID associated with the selected characteristic word. It is possible to provide the scheme capable of allowing users to easily search for a television program intended for watching and listening and information about the television program.

Moreover, according to the third information processing apparatus, the method, and the software program of the present invention, the apparatus receives a file including the information about characteristic words representing the television program characteristic. The apparatus transmits information about the user-selected characteristic words out of those included in the file to the other apparatuses. As a result of the transmission, the apparatus receives the television program about the television program from the other apparatuses. It is possible to provide the scheme capable of allowing users to easily search for a television program intended for watching and listening and information about the television program.

The invention claimed is:

1. An information processing system, comprising:
a server programmed to generate a characteristic word file containing a plurality of characteristic words extracted from each of a plurality of television program information which includes information concerning respective television programs, each of the plurality of characteristic words being included in the plurality of television program information, and each of the plurality of characteristic words being extracted by analyzing contents of each of the plurality of television program information, wherein each of the plurality of television program information includes a title, a separate television program description, and a genre, and each characteristic word is extracted by analyzing each of the title, the entire television program description, and the genre of the respective television program information; and
an information processing apparatus including:
an interface programmed to receive the characteristic word file containing the plurality of characteristic words extracted from each of the plurality of television program information;
a display section configured to display the plurality of characteristic words and to change a color of a displayed one of the plurality of characteristic words relative to a color of an other displayed one of the plurality of characteristic words; and
a communication section that allows a user to select the displayed one of the plurality of characteristic words, wherein
the interface is further programmed to transmit information about the displayed one of the plurality of characteristic words selected by the user to the server upon the selection, and is configured to receive television program information about one of the television programs from the server in response to the transmitted information about the displayed one of the plurality of characteristic words selected by the user.

2. The information processing system according to claim 1, wherein the interface receives the characteristic word file containing the plurality of characteristic words from the server.

3. The information processing system according to claim 1, wherein the display section is further configured to display only the plurality of characteristic words, when a search mode is enabled.

4. The information processing system according to claim 1, wherein the display section is further configured to display the displayed one of the plurality of characteristic words in an inverted color relative to the other displayed one of the plurality of characteristic words.

5. The information processing system according to claim 1, wherein the display section is further configured to display the displayed one of the plurality of characteristic words in an upper part of the display section relative to the other displayed one of the plurality of the characteristic words.

6. An information processing method implemented by an information processing system including a server and a display apparatus, comprising:
generating, at the server, a characteristic word file containing a plurality of characteristic words extracted from each of a plurality of television program information which includes information concerning respective television programs, each of the plurality of characteristic words being included in the plurality of television program information, and each of the plurality of characteristic words being extracted by analyzing contents of each of the plurality of television program information, wherein each of the plurality of television program information includes a title, a separate television program description, and a genre, and each characteristic word is extracted by analyzing each of the title, the entire television program description, and the genre of the respective television program information;
controlling, at the display apparatus, a reception of the characteristic word file containing the plurality of characteristic words extracted from each of the plurality of television program information;
displaying, with the display apparatus, the plurality of characteristic words and changing a color of a displayed one of the plurality of characteristic words relative to a color of an other displayed one of the plurality of characteristic words;
allowing a user to select one of the plurality of characteristic words displayed;
controlling a transmission of information about the displayed one of the plurality of characteristic words selected by the user to the server upon the selection; and
controlling a reception of television program information about one of the television programs from the server in response to the transmission of the information about the displayed one of the plurality of characteristic words selected by the user.

7. The information processing method according to claim 6, wherein, in the controlling the reception of the characteristic word file containing the plurality of characteristic words, the information about the plurality of characteristic words is received from the server.

8. The information processing method according to claim 6, further comprising:
displaying, with the display apparatus, only the plurality of characteristic words, when a search mode is enabled.

9. The information processing method according to claim 6, wherein, in the changing, the display apparatus displays the displayed one of the plurality of characteristic words in an inverted color relative to the other displayed one of the plurality of characteristic words.

10. The information processing method according to claim 6, further comprising:
displaying the displayed one of the plurality of characteristic words in an upper part of the display apparatus relative to the other displayed one of the plurality of characteristic words.

11. A computer-readable, non-transitory storage media encoded with computer executable instructions, wherein the instructions, when executed by at least one processing unit, cause the at least one processing unit to perform a method comprising:
generating a characteristic word file containing a plurality of characteristic words extracted from each of a plurality of television program information which includes information concerning respective television programs, each of the plurality of characteristic words being included in the plurality of television program information, and each of the plurality of characteristic words being extracted by analyzing contents of each of the plurality of television program information, wherein each of the plurality of television program information includes a title, a separate television program description, and a genre, and each characteristic word is extracted by analyzing each of the title, the entire television program description, and the genre of the respective television program information;

controlling a reception of the characteristic word file containing the plurality of characteristic words extracted from each of the plurality of television program information;

controlling a display section to display the plurality of characteristic words and changing a color of a displayed one of the plurality of characteristic words relative to a color of an other displayed one of the plurality of characteristic words;

allowing a user to select one of the plurality of characteristic words displayed;

controlling a transmission of information about the displayed one of the plurality of characteristic words selected by the user upon the selection; and controlling a reception of television program information about one of the television programs in response to the transmission of the information about the displayed one of the plurality of characteristic words selected by the user.

12. The computer-readable, non-transitory storage media according to claim 11, wherein the instructions cause the at least one processing unit to control the display section to display only the plurality of characteristic words, when a search mode is enabled.

13. The computer-readable, non-transitory storage media according to claim 11, wherein the instructions cause the at least one processing unit to control the display section to display the displayed one of the plurality of characteristic words in an inverted color relative to the other displayed one of the plurality of characteristic words.

14. The computer-readable, non-transitory storage media according to claim 11, wherein the instructions cause the at least one processing unit to control the display section to display the displayed one of the plurality of characteristic words in an upper part of the display section relative to the other displayed one of the plurality of characteristic words.

15. The information processing method according to claim 6, wherein the characteristic word file is created by analyzing the plurality of television program information which further includes a plurality of television program IDs which each identify a respective television program information, wherein each said characteristic word is a word that represents a characteristic of one of the respective television programs.

16. The information processing method according to claim 15, wherein the server creates an association file containing the plurality of determined characteristic words and associates each of the plurality of determined characteristic words with a respective television program ID of the television program information corresponding to said characteristic word, receives the information about the displayed one of the plurality of characteristic words selected by the user from the interface, identifies a respective television program ID associated with the received information about the displayed one of the plurality of characteristic words selected by the user by comparing the received information about the displayed one of the plurality of characteristic words with the plurality of determined characteristic words contained in the association file, and transmits television program information concerning a respective television program corresponding to said identified respective television program ID.

17. The information processing apparatus according to claim 1, wherein the plurality of characteristic words are extracted by further analyzing sentences in the television program information, excluding certain types of words, dividing the remaining sentences into words, and extracting the characteristic words from the divided words based on a predetermined scheme.

* * * * *